US012784069B2

(12) United States Patent
Mattison et al.

(10) Patent No.: US 12,784,069 B2
(45) Date of Patent: Nov. 3, 2026

(54) SYSTEM AND METHOD FOR GENERATING AND TRANSMITTING SHAREABLE ELECTRONIC NOTIFICATION DATA VIA A HARDWARE DEVICE NETWORK

(71) Applicant: BANK OF AMERICA CORPORATION, Charlotte, NC (US)

(72) Inventors: Paul Martin Mattison, Sherrills Ford, NC (US); Martha Sain McClellan, Lancaster, SC (US); David Smiddy, Chadds Ford, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 606 days.

(21) Appl. No.: 17/584,470

(22) Filed: Jan. 26, 2022

(65) Prior Publication Data

US 2023/0237517 A1 Jul. 27, 2023

(51) Int. Cl.
*G06Q 30/02* (2023.01)
*G06Q 30/0204* (2023.01)
(Continued)

(52) U.S. Cl.
CPC ..... *G06Q 30/0205* (2013.01); *G06Q 30/0207* (2013.01); *H04W 4/021* (2013.01); *H04W 68/005* (2013.01); *H04W 76/14* (2018.02)

(58) Field of Classification Search
CPC ............... G06Q 30/02; G06Q 30/0205; G06Q 30/0207; G06Q 30/0261; G06Q 30/0267;
(Continued)

(56) References Cited

U.S. PATENT DOCUMENTS 8,089,943 B2 1/2012 Lim
8,566,197 B2 10/2013 Satyavolu et al.
(Continued)

FOREIGN PATENT DOCUMENTS

| | | | |
|---|---|---|---|
| EP | 3654171 A1 * | 5/2020 | ............... G06F 7/02 |
| EP | 3272105 B1 * | 5/2021 | ............ H04L 29/08 |
| KR | 2017-0057463 A * | 5/2017 | |

OTHER PUBLICATIONS

Leandro M. De Sales; Thiago B. M. de Sales; Hyggo Almeida; Angelo Perkusich; Kyller Gorgonio, Generalized connections and incentives for supporting CE devices in live streaming systems (English), IEEE Transactions on Consumer Electronics (vol. 60: Issue: 4, 2014, pp. 605-613), Feb. 20, 2015 (Year: 2015).*
(Continued)

*Primary Examiner* — Marilyn G Macasiano
(74) *Attorney, Agent, or Firm* — Moore & Van Allen PLLC; Nicholas C. Russell

(57) ABSTRACT

Embodiments of the invention are directed to a system and method for generating and transmitting shareable electronic notification data via a hardware device network. A non-transitory wireless signal is broadcasted from a front-line unit in a network of front-line units, and a user determined to be in proximity to the front-line unit receives via the wireless signal reward data from a database. Electronic notification data is transmitted to the user device, whereafter the electronic notification data is displayed and an option to share the reward data to a secondary user is provided. Once shared, the secondary user's user device establishes a connection to the front-line unit to receive the reward data from the rewards database.

15 Claims, 4 Drawing Sheets

(51) Int. Cl.
*G06Q 30/0207* (2023.01)
*H04W 4/021* (2018.01)
*H04W 68/00* (2009.01)
*H04W 76/14* (2018.01)

(58) Field of Classification Search
CPC ............. G06Q 30/0254; G06Q 10/067; G06Q 30/0246; H04W 4/021; H04W 68/005; H04W 76/14; H04W 4/023; H04W 4/06
See application file for complete search history.

(56) References Cited

U.S. PATENT DOCUMENTS

| | | | | |
|---|---|---|---|---|
| 9,105,039 | B2 | 8/2015 | Kramer et al. | |
| 9,338,622 | B2 | 5/2016 | Bjontegard | |
| 9,342,828 | B2 | 5/2016 | Sanchez et al. | |
| 9,526,032 | B2 | 12/2016 | Ely et al. | |
| 10,304,049 | B2 * | 5/2019 | Chatterjee | G06Q 20/3224 |
| 10,419,907 | B2 * | 9/2019 | Redding | H04W 4/80 |
| 10,438,299 | B2 | 10/2019 | Amaro et al. | |
| 10,482,478 | B2 * | 11/2019 | Tietzen | G06Q 30/0201 |
| 10,762,532 | B2 * | 9/2020 | Proctor, Jr. | G06Q 20/202 |
| 10,860,995 | B2 | 12/2020 | Kelly et al. | |
| 10,902,473 | B2 | 1/2021 | Beck et al. | |
| 10,909,562 | B2 | 2/2021 | Roeding et al. | |
| 10,922,719 | B1 * | 2/2021 | Bergstrom | G06Q 30/0257 |
| 2013/0006738 | A1 * | 1/2013 | Horvitz | G06Q 10/40 705/14.39 |
| 2014/0195620 | A1 * | 7/2014 | Srinivasan | H04L 51/214 709/206 |
| 2015/0220951 | A1 | 8/2015 | Kurapati et al. | |
| 2015/0348083 | A1 | 12/2015 | Brill et al. | |
| 2016/0086222 | A1 | 3/2016 | Kurapati | |
| 2019/0108682 | A1 | 4/2019 | Spivack et al. | |
| 2020/0380563 | A1 * | 12/2020 | Shiffert | H04W 4/023 |
| 2023/0067746 | A1 * | 3/2023 | Tilahun | G06Q 20/20 |

OTHER PUBLICATIONS

Providing an Advertising Based Incentive to a User (English (United States)), The IP.com Prior Art database, May 22, 2008 (Year: 2008).*

Will, M. O.; Huynh, T.; Vogel, V.; Stub, M., Word of mouth marketing for real world recommendations (English), 2010 14the International Conference on Intelligence in Next Generation Networks (2010, pp. 1-6), Oct. 1, 2010 (Year: 2010).*

Method and System for Gaining Consumer Information Proximity to Point-of-Sale (English(UNited States)), The IP.com Prior Art Database, Oct. 10, 2006 (Year: 2006).*

* cited by examiner

SYSTEM AND METHOD FOR GENERATING AND TRANSMITTING SHAREABLE ELECTRONIC NOTIFICATION DATA VIA A HARDWARE DEVICE NETWORK

BACKGROUND

Currently, electronic data is provided to a user device through internet traffic, via an internet browser or mobile application. Generally, sharing the electronic data to a secondary user requires screenshots or tagging, and generally the electronic data are not targeted or customized to the secondary user. As such, there exists a need for a system and method for generating and transmitting shareable electronic notification data via a hardware device network.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for generating and transmitting shareable electronic notification data via a hardware device network.

Currently, electronic data such as advertisements, messages, alerts, or the like are transmitted to a user device via a wireless network to which the user device is connected, such as WI-FI internet, or the like. The electronic data are targeted to users and user devices regardless of the user's location, and the electronic data may take into consideration the user's history such as browsing history, resource transfer history, or the like. In instances where electronic data are provided to the user device based on geographic location of the user device, this is typically accomplished by using Global Positioning System ("GPS") information from the user device. Furthermore, these electronic data are not configured to be shared with secondary users such as friends, family, etc., who also happen to be in the same geographic location as the user device of the user.

Embodiments of the invention are directed to a system, method, or computer program product for generating and transmitting shareable electronic notification data via a hardware device network, the invention comprising broadcasting a wireless non-transitory signal from a front-line unit, the front-line unit connected to a network of a plurality of front-line units, the wireless non-transitory signal broadcasted unselectively, identifying a user in proximity to the front-line unit, wherein the proximity of the user to the front-line unit is determined from a geolocation of a first user device, establishing a first communicable link between the front-line unit and the first user device, the first communicable link established by connecting the front-line unit and the first user device via the wireless non-transitory signal, sending, to the front-line unit, a rewards database from one or more merchants, the rewards database comprising reward data associated with each merchant, transmitting electronic notification data from the front-line unit to the first user device, electronic notification data comprising the reward data and a description of the reward, and displaying electronic notification data on a graphical user interface of the first user device.

In some embodiments, or in combination with any of the previous embodiments, the system, method, or computer program product further comprises determining one or more secondary users by accessing contacts information stored in a memory device of the first user device of the user, wherein the secondary users are associated with the entity and in proximity to the user, establishing a second communicable link, the second communicable link between the first user device and a second user device, and displaying on the first user device an option to share the reward data from the first user device to the second user device.

In some embodiments, or in combination with any of the previous embodiments, the system, method, or computer program product further comprises establishing a third communicable link, the third communicable link between the front-line unit and the second user device, and wherein the third communicable link between the front-line unit and the second user device is configured to transmit the reward data to the second user device from the front-line unit, and displaying the electronic notification data comprising reward data on the graphical user interface of the second user device.

In some embodiments, or in combination with any of the previous embodiments, the proximity of the front-line unit to the user is determined based on a geographic radius boundary measured outwardly from the front-line unit, and wherein instances in which two or more geographic radius boundaries converge, the system establishes the first communicable link between the front-line unit nearest to the user device and the first user device.

In some embodiments, or in combination with any of the previous embodiments, the proximity of the user and the first user device to the front-line unit is determined by the first user device, the first user device configured to compare the geolocation of the first user device with a list of known geolocations of front-line units, the first user device notifying the front-line unit of the proximity of the first user device.

In some embodiments, or in combination with any of the previous embodiments, the proximity of the user and the first user device to the front-line unit is determined by the front-line unit, the front-line unit configured to compare the geolocation of the front-line unit with the geolocation of the first user using the wireless signal.

In some embodiments, or in combination with any of the previous embodiments, wherein the processing device is further configured to execute the computer-readable program code to store the reward data on a repository of the first user device for use at a later time.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
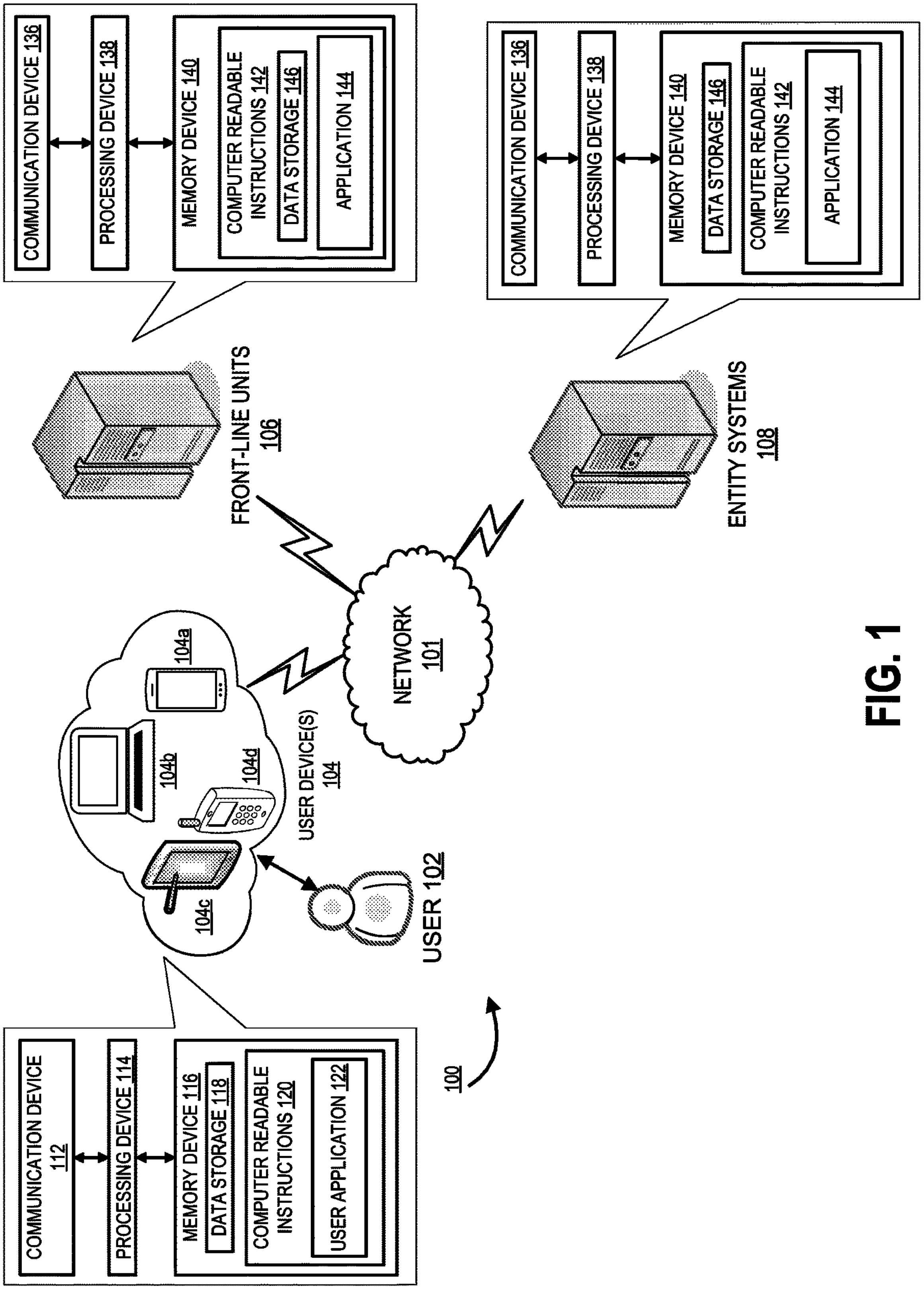
Figure 2:
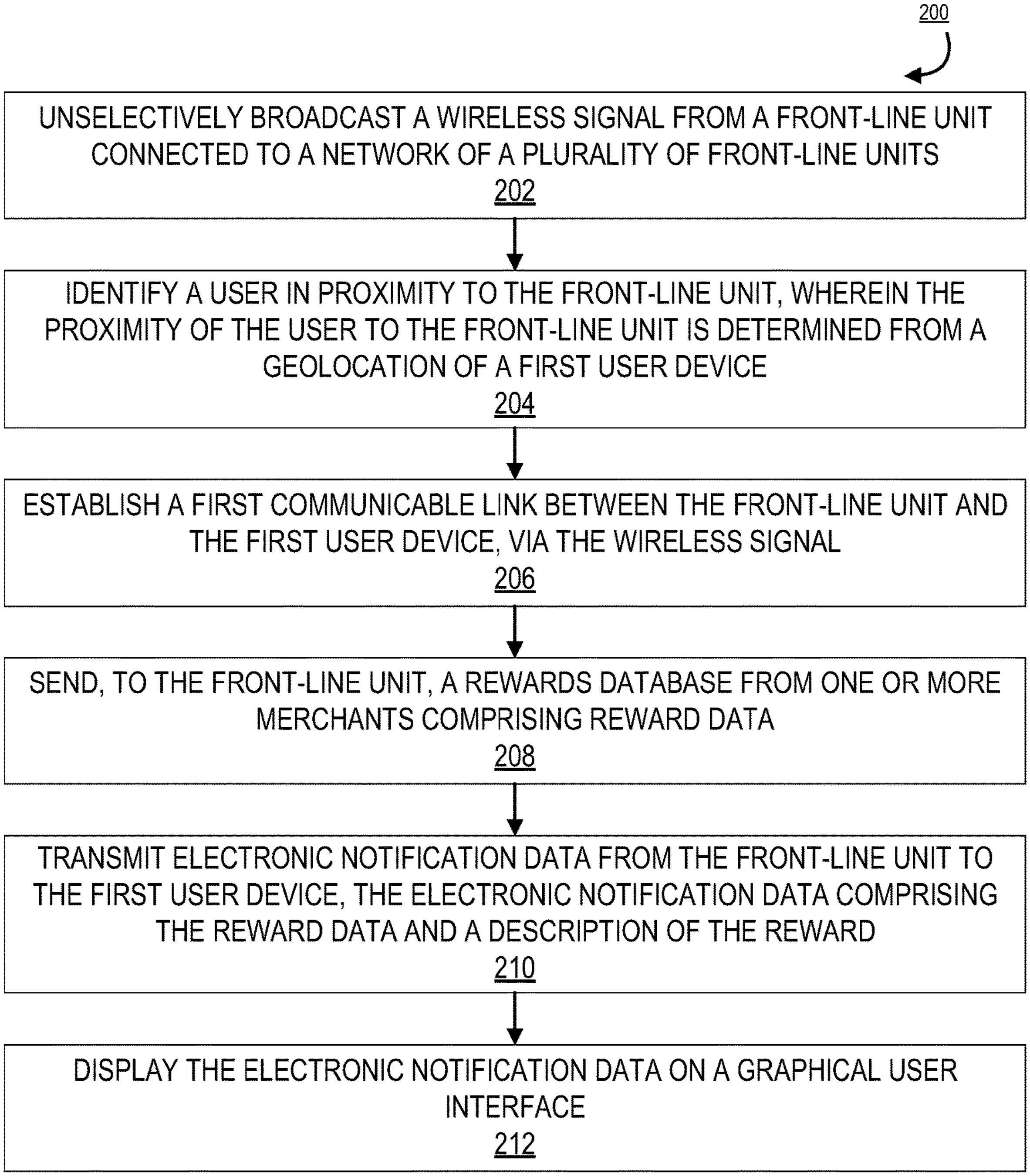
Figure 3:
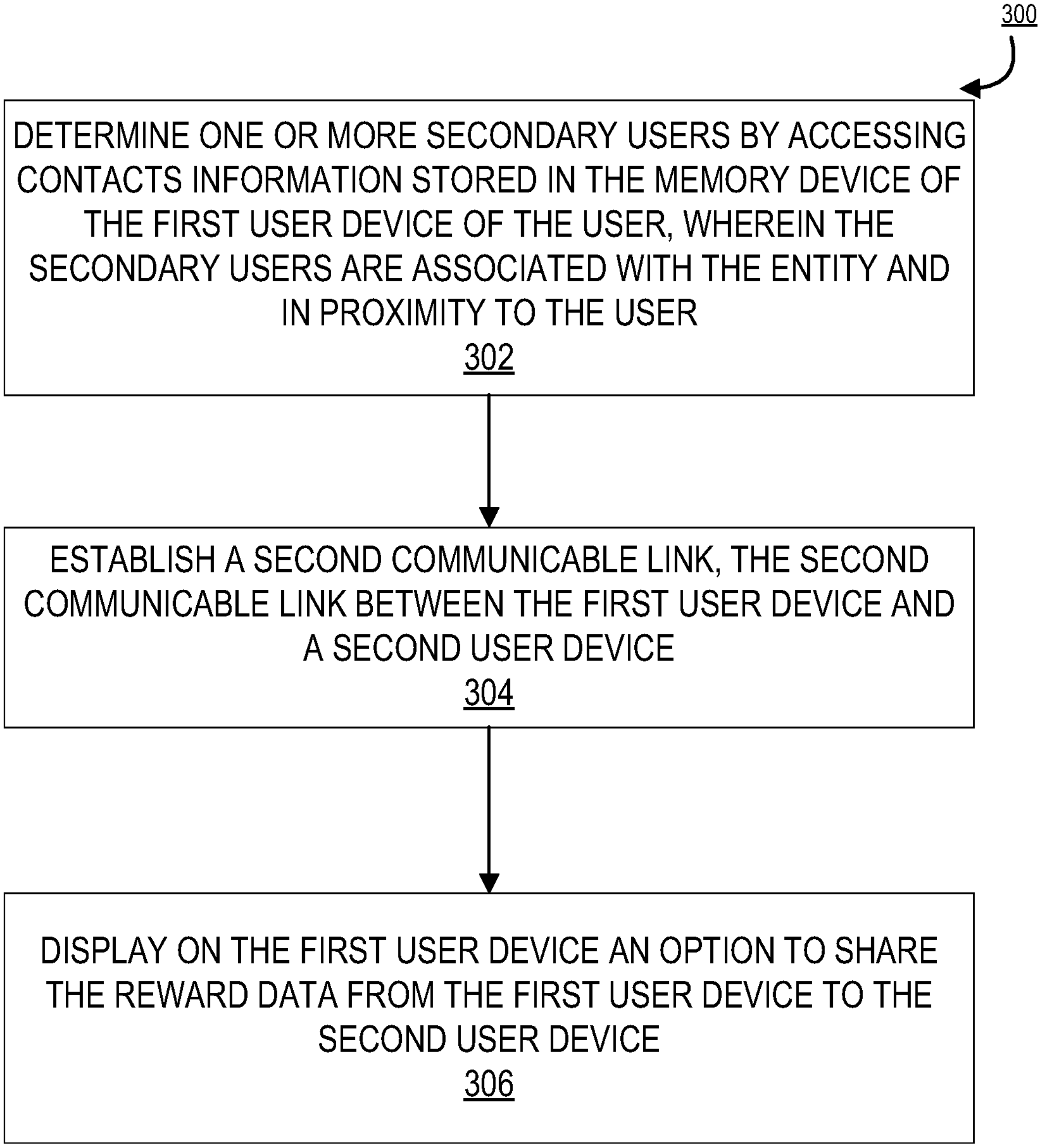
Figure 4:
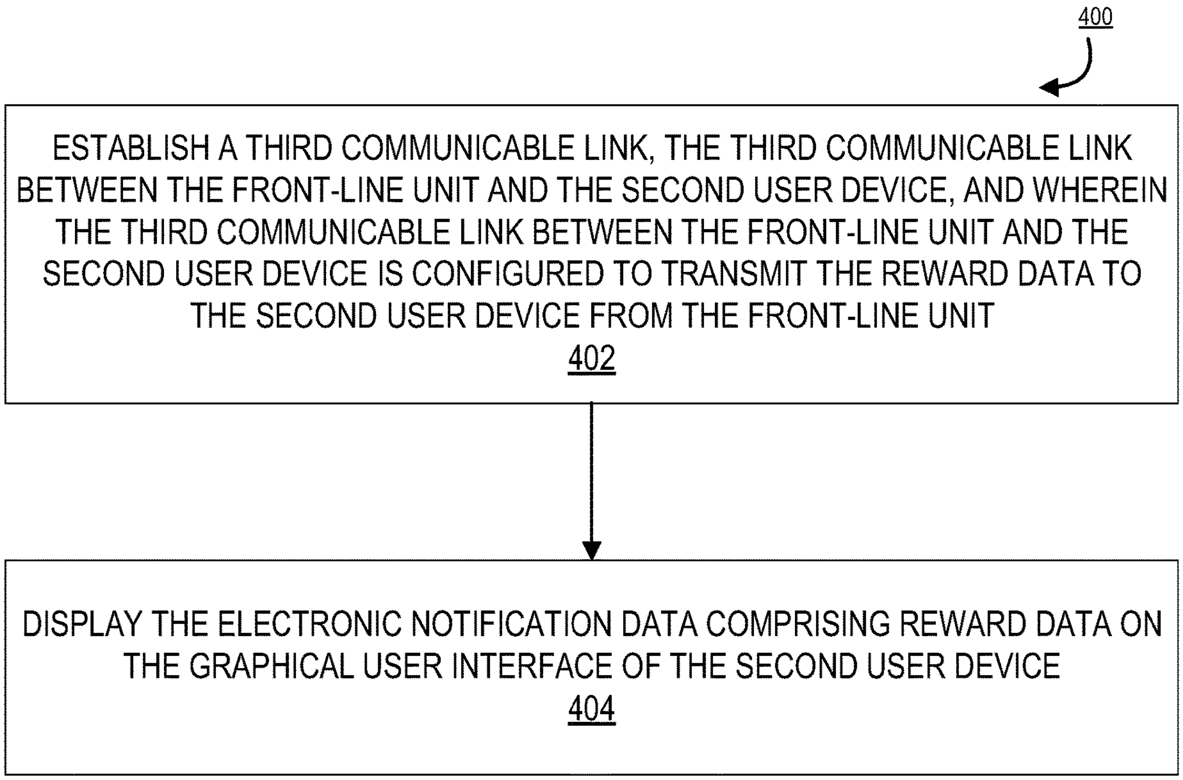

Having thus described embodiments of the invention in general terms, reference will now be made to the accompanying drawings, wherein:

FIG. 1 illustrates a network environment in which the processes described herein are implemented, in accordance with some embodiments of the present invention;

FIG. 2 illustrates a block diagram of a method for generating and transmitting shareable electronic notification data via a hardware device network, in accordance with some embodiments of the present invention;

FIG. 3 illustrates a block diagram of a method for sharing shareable electronic notification data via a hardware device network, in accordance with some embodiments of the present invention; and FIG. 4 illustrates a block diagram of a method for sharing and transmitting shareable electronic notification data via a hardware device network, in accordance with some embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Embodiments of the invention are directed to a system and method for generating and transmitting shareable electronic notification data via a hardware device network. A non-transitory wireless signal is broadcasted from a front-line unit in a network of front-line units, and a user determined to be in proximity to the front-line unit receives via the wireless signal reward data from a rewards database. Electronic notification data is transmitted to the user device, whereafter electronic notification data is displayed and an option to share to a secondary user is provided. Once shared, the secondary user's user device establishes a connection to the front-line unit to receive the reward data from the rewards database.

In accordance with embodiments of the invention, the term "entity" may be used to include any organization or collection of users that may interact with a network. An entity may refer to a business, company, or other organization that either maintains or operates the system or requests use and accesses the system. "Entity" may be used to include any organization that processes financial transactions including, but not limited to, banks, credit unions, savings and loan associations, investment companies, stock brokerages, resource management firms, insurance companies or the like.

A "user" as used herein may refer to any entity or individual associated with the system. In some embodiments, a user may be a computing device user, a phone user, a mobile device application user, a financial institution customer (e.g., an account holder or a person who has an account (e.g., banking account, credit account, or the like)), a system operator, database manager, a support technician, and/or employee of an entity. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, laptop computers, cameras, video recorders, audio/video player, radio, global positioning system (GPS) devices, or any combination of the aforementioned. In some embodiments, a device may refer to an entity's computer system, platform, servers, databases, networked devices, or the like. The device may be used by the user to access the system directly or through an application, online portal, internet browser, virtual private network, or other connection channel. The device may be a computer device within a network of connected computer devices that share one or more network storage locations.

As used herein, the term "front-line unit" may refer to electronic hardware devices associated with the entity for use in relations with customers of the entity through automation and computing servicing, such as automated teller machines (ATMs), kiosks, computer terminals, point-of-sale (POS) locations, or the like. In some embodiments, a plurality of front-line units are distributed across an enterprise that may cover a large geographical region, including across the world. As such, the individual front-line units may be disparate, separate, or otherwise at least partially independent of one another throughout the enterprise. For example, two front line units that are associated with different entity processes may be managed by different individuals, in different departments within the overall managing entity's structure.

As used herein, the term "reward data" may refer to any electronic promotion, advertisement, targeted messaging, reward, or the like, which is offered by a merchant to reach consumers or potential consumers of said merchant in order to motivate or promote resource activities or distribute messaging. For one non-limiting example, a merchant may offer a reward to a potential consumer for a ten percent (10%) discount on the consumer's next purchase at the merchant. Or, in some embodiments, a merchant may wish to provide a reward which offers messaging such as "low inventory" of a particular product or service. In other embodiments, the reward may be a hyperlink or shortcut to reserve or purchase a product or service, such as an inventory item or an available table at a restaurant. In yet additional embodiments, the merchant may provide a reward as a means to offer gratitude for patronizing an establishment.

Although the aforementioned examples have been provided, it should be known that numerous additional rewards are capable of being provided to a consumer or potential consumer, and as such reward data may be any number of messages, both graphic, text, voice, audio, SMS, video, or the like, to a consumer or potential consumer, said message being propagated through the system discussed herein as electronic notification data or reward data, depending on the identity of the transmitter and the contents of the data. The electronic notification data and/or reward data may be encrypted, decrypted, compressed, or otherwise altered to facilitate the transmission of said data throughout the systems and network.

As used herein, the term "reward database" may refer to the electronic storage format of reward data in a repository or storage device of the entity, merchant, user device, or the like. For example, a merchant may wish to have a plurality of rewards to be used under certain conditions, and as such a means for storing and queuing the reward data is needed. Certain conditions may be the outcome of a sports event, the inventory level of a product or service, the arrival of a new product or service, the level of interaction between a user and the merchant, or the like.

As used herein, the term "wireless signal" may refer to a non-transitory signal propagated by or received to a front-line unit as a means to transmit data such as the electronic notification data or reward data. The wireless signal used by such data may be Bluetooth short range wireless, Near Field Communication ("NFC"), Wi-Fi, free-space optical communication ("FSO"), infrared ("IR"), sonic or ultrasonic radio, GPS, cellular data such as GSM, CDMA, GPRS, through 3G, 4G, or 5G networks, low-power wide-area networks ("LPWAN"), satellite communications, or the like.

As used herein, the term "communicable link" may refer to the connection between two or more devices through the wireless signal or network of wireless signals that positively identifies one or more parties to the connection and allows the communication (e.g. sending and/or receiving of data) through the wireless signal. A communicable link may occur as a result of appropriate geographic proximity to a device which hosts or transmits/receives a wireless signal. In some embodiments a communicable link is established without a necessary intervention by a user on a user device, such as entering a password or clicking/pressing a portion of the graphical user interface to confirm acceptance of the communicable link. In other embodiments, a user may be required to complete a necessary step such as the aforementioned intervention in order to establish a connection with the wireless signal and thereby establish a communicable link.

FIG. 1 illustrates a system that includes specialized systems and devices communicably linked across a network to perform a method for generating and transmitting shareable electronic notification data via a hardware device network. FIG. 1 provides an environment 100 for the system, in accordance with one embodiment of the present invention.

As illustrated in FIG. 1, the entity systems 108 is operatively coupled, via a network 101 to the user device 104, and to front-line units 106. In this way, entity systems 108 can send information to and receive information from the user device 104 and front-line units 106. It shall be noted that in some embodiments of the invention, front-line units 106 are merely systems along entity systems 108, and as such entity systems 108 may comprise front-line units 106. FIG. 1 illustrates only one example of the system environment 100, and it will be appreciated that in other embodiments one or more of the systems, devices, or servers may be combined into a single system, device, or server, or be made up of multiple systems, devices, or servers.

The network 101 may be a global area network (GAN), such as the Internet, a wide area network (WAN), a local area network (LAN), or any other type of network or combination of networks, including wireless networks. The network 101 may provide for wireline, wireless, or a combination wireline and wireless communication between devices on the network.

FIG. 1 also illustrates a user device 104. The user device 104 may be any communication device such as a smart phone 104*a*, a telephone 104*d*, a tablet 104*c*, a computer 104*b*, or the like. The user device 104 generally comprises a communication device 112, a processing device 114, and a memory device 116. The processing device 114 is operatively coupled to the communication device 112 and the memory device 116. The processing device 114 uses the communication device 112 to communicate with the network 101 and other devices on the network 101, such as, but not limited to the entity systems 108 and front-line units 106. As such, the communication device 112 generally comprises a modem, server, or other device for communicating with other devices on the network 101.

As further illustrated in FIG. 1, the user device 104 comprises computer-readable instructions 120 stored in the memory device 116, which in one embodiment includes the computer-readable instructions 120 of a user application 122 and data storage 118. A user device 104 may be any communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, voice assistants, laptop computers, cameras, video recorders, audio/video player, radio, GPS devices, any combination of the aforementioned, or the like. Although only one user device 104 is depicted in FIG. 1, the system environment 100 may comprise a plurality of user devices 104. In some embodiments of the invention described herein, a plurality of user devices 104 is used.

As illustrated in FIG. 1, the entity systems 108 generally comprises a communication device 136, a processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the front-line units 106 and the user device 104. As such, the communication device 136 generally comprises a modem, server, or other device for communicating with other devices on the network 101.

As further illustrated in FIG. 1, the entity systems 108 comprises computer-readable instructions 142 stored in the memory device 140, which in one embodiment includes the computer-readable instructions 142 of an application 144. In some embodiments, memory device 140 includes data storage 146 for storing data related to the system environment, but not limited to data created and/or used by the application 144.

Embodiments of the entity systems 108 may include multiple systems, servers, computers or the like maintained by one or many entities. FIG. 1 merely illustrates one of those systems. In one embodiment of the invention, the entity systems 108 is operated by a second entity that is a different or separate entity from front-line units 106. In some embodiments, the front-line units 106 may be part of the entity systems 108. Similarly, in some embodiments, the entity systems 108 is part of the front-line units 106.

In one non-limiting example of the entity systems 108 the memory device 140 stores an application 144. In one embodiment of the invention, the application 144 may comprise computer executable program code that instructs the processing device 138 to operate the communication device 136 to perform certain communication functions described herein. In one embodiment, the computer-executable program code of an application associated with the network and application 144 may also instruct the processing device 138 to perform certain logic, data processing, and data storage functions of the application.

The processing device 138 is configured to use the communication device 136 to gather data, such as data corresponding to reward data, electronic notification data, data regarding the geographic location of the user, or the like. The processing device 138 stores the data that it receives in its memory device 140.

Front-line units 106 are each operatively coupled to entity systems 108, user device 104, and/or each other through network 101. Front-line units 106 have systems with devices the same or similar to devices described for entity systems 108 and/or user device 104 (i.e., communication device, processing device, memory device). Therefore, front-line units 106 communicate with each other, and/or with user device 104, and/or with entity systems 108 in the same or similar way as previously described with respect to each system.

As such, front-line units 106 each generally comprise a communication device, at least one processing device, and a memory device. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device is operatively coupled to the communication device and the memory device. The processing device uses the communication device to communicate with the network 101 and other devices on the network 101. As such, the communication device generally comprises a modem, server, wireless transmitters or other devices for communicating with devices on the network 101. The memory device typically comprises a non-transitory computer readable storage medium, comprising computer readable/executable instructions/code, such as the computer-readable instructions, as described below.

As further illustrated in FIG. 1, front-line units 106 each comprise computer-readable instructions or computer readable program code stored in the memory device. The computer readable instructions, when executed by the processing device 138 are configured to cause the processing device to perform one or more steps described in this disclosure.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a block diagram 200 of a method for generating and transmitting shareable electronic notification data via a hardware device network, in accordance with some embodiments of the present invention. As illustrated in block 202, the system first begins by unselectively broadcasting a wireless signal from a front-line unit connected to a network of a plurality of front-line units. The system described herein is predicated on the notion that a front-line unit is accessible to a user, wherein the user is associated with the entity in some capacity (e.g. the user is a customer of the entity, or the user has a user device program or application downloaded to their user device which allows the user device to communicate with the entity and/or with the front-line unit). In some physical locations, a user may be physically near multiple front-line units.

Each of the front-line units comprises communication devices which are configured to broadcast a wireless signal from the front-line unit in an unselective way, such that an entire geographic area receives the wireless signal, and all of the users within said geographic area are capable of receiving said wireless signal. The wireless signal is considered unselective because the wireless signal is not targeting one specific user, rather any user within the geographic area with a user device configured to receive such a wireless signal and connect to the wireless signal is capable of doing so, with or without the explicit knowledge of the user. Situation which may occur when multiple front-line units broadcasting wireless signals will be described in greater detail herein.

Block 204 continues the process by identifying a user in proximity to a front-line unit, wherein the proximity of the user to the front-line unit is determined from a geolocation of a first user device. Although the proximity of the user may be determined based on the geolocation of the first user device through means such as GPS, geolocation may also be determined simply by affirming that the first user device has received the wireless signal described in block 202. The wireless signal may only be broadcast to a small geographic range, such as a determined radius (distance from the front-line unit) as determined by the type of wireless signal used. As such affirming that the first user device, and consequently the user, are within said geographic range may be accomplished simply by connection to the wireless network.

In some embodiments, when a user is identified to be in proximity to the front-line unit, the front-line unit may communicate with entity systems to determine the identification and/or details of the user, such that the front-line may intelligently determine whether connection to the wireless network is appropriate in the situation or not. For example, a first user device may have an application of an entity installed on the first user device, but the user may not be affiliated with the entity in ways such as membership or the like. In such an instance, the front-line unit may determine whether or not to establish a connection with the user device. In other embodiments, the front-line unit may only wish to establish a connection via the wireless network to the first user device under time conditions, such that if the first user device is within the operating range of the wireless signal for a minimal amount of time (e.g. less than 30 seconds, or less than an hour, and so forth), the wireless signal connection is not established because the first user device was not within the proximity to the front-line unit for the specified time period.

In yet additional embodiments, proximity may be determined based on a geographic boundary established as a radius measured outwardly from the front-line unit. Although wireless signal devices such as Bluetooth, Wi-Fi, or others do not have the capability of directly determining the distance at which the first user device is located (or second user device, as will be described herein), the front-end unit may be configured to determine a received strength signal indicator ("RSSI") to infer the distance at which the user is located from the front-line unit. A proximity may be established to be a distance less than that which the wireless signal is capable of transmitting to, for example the entity may decide that a user must be within ten feet of the front-line unit to be considered "in proximity" to the front-line unit, whereas the wireless signal may be received outwardly at twenty feet or more. Furthermore, some wireless signals are capable of determining location, and thereby proximity to the front-line unit through means such as triangulation, radar, sonar, or the like.

In further embodiments, the proximity of the user and the first user device to the front-line unit is not determined by the front-line unit, but rather the proximity is determined by the first user device. The first user device may be equipped with software applications with known data pertaining to the geographic or geolocations of some or all of the front-line units of an entity. As such these geolocations are known to the first user device. The geolocation or location of the first user device may be determined using methods such as wireless signal triangulation, global positioning system triangulation, or the like, and as such the geolocation of the first user device is also known to the first user device. The software application of the first user device compares the location of the first user device to a list of geolocations of front-line units, and thereafter the software application is capable of calculating the distance between the two points (the first user device and the front-line unit) using the difference in the longitude and latitude measurements. The list of geolocations of the front-line units may also be accompanied by a list of the boundaries defined to be "in proximity" for each of these front-line units, such that once the first user device determines it is within said boundaries, the first user device is receptive of receiving the wireless signal from the front-line unit in order to establish communication.

In instances where a user may be located within proximity to two or more front-line units, in some embodiments the system is configured to assign the user to the front-line unit to which the user is closest in distance, and not establish any communication with the other front-line units further away. For example, if the user is 10 ft from a first front-line unit, and also 15 ft from a second front-line unit, the system would automatically register the user to be in proximity to the first front-line unit. The front-line units each determine the proximity information of the user individually but communicate across entity systems to resolve the conflict.

In other embodiments, the system may be agnostic as to the instances where a user may be located within proximity to two or more front-line units, and the system is configured to allow the user to receive reward data from any front-line unit to which the user is considered "in proximity" to. For example, if the user is 10 ft from a first front-line unit and within the reach of the wireless signal of the first front-line unit, and also 15 ft from a second front-line unit to which the user is within the reach of the wireless signal, the system would allow the user to be in proximity to the both front-line units. In this way, the front-line units do not need to communicate with each other to resolve any conflict. Furthermore, the user device of a user who is in proximity to a plurality of front-line units in this embodiment may be configured to receive reward data from each of these front-line units, while the application of the user device removes redundant reward data offered by each of the front-line units. In this way, reward data that is available on multiple front-line units to which the user has proximity would not be applied multiple times to the same user device.

Continuing with the process, block 206 describes establishing a first communicable link between the front-line unit and the first user device, via the wireless signal. As previously mentioned, once a first user device has been determined to be in proximity to a front-line unit, the system is configured to determine when to establish a connection with the first user device, depending on a variety of factors such as time in the physical location near the front-line unit, characteristics of the user such as membership to certain entities, or the like. In some embodiments, the front-line unit After the front-line unit has decided to establish a connection with the first user device, a first communicable link is established, wherein the first communicable link is a connection between the first user device and the front-line unit in such a capacity as to allow for transmission of data between (e.g. to and/or from) the first user device and the front-line unit. Such data may include reward data, electronic notification data, or the like.

Establishing the first communicable link may comprise sending a request to the first user device to establish the first communicable link. For example, a pop-up notification on the first user device may request that the user actively accept forming/establishing the first communicable link via a clickable button, link, text/SMS message verification, or the like. In other embodiments, the permissions accepted during the downloading of the entity software application onto the first user device may allow for establishing a first communicable link, and thereby a connection, with the front-line unit in the background and without intervention required by a user and/or knowledge of the user.

The process continues in block 208 by sending to the front-line unit, a rewards database from one or more merchants, wherein the rewards database comprises reward data. A "merchant" as used herein, refers to any number of businesses providing services, entertainment, or products. The merchant typically has a relationship with the entity, such that the merchant is capable of providing the entity with rewards information. The rewards, as previously described, provide motivation or gratitude for patronizing a merchant. While a merchant may have only one reward at a time, in some embodiments a merchant may have a plurality of rewards to provide to users at any given moment in time. In some embodiments, each reward data may be configured to be presented to users if certain conditions are met. As such, the front-line units need to maintain a database, known as a rewards database, to store in a repository such reward data. In this way, the front-line unit may transmit the reward data at any given time without requiring on-demand communication with the merchant.

The rewards database may be populated, audited, synchronized, or modified by either the merchant or the entity on any determined schedule (e.g. hourly, daily, weekly, monthly, or the like). For some reward data, the rewards database may be modified to delete certain reward data automatically under certain conditions, such as when a certain number of reward data are distributed or used, certain inventory levels of products are reached, or the like. The rewards database may be maintained by the entity in some embodiments, or in other embodiments the rewards database may be maintained by the merchants, or a combination thereof. In some embodiments, each merchant may maintain a rewards database, and as such the front-line unit is configured to receive (or be sent) a plurality of rewards databases.

Having established a communicable link between the front-line unit and the first user device via the wireless signal, block 210 continues the process by transmitting electronic notification data from the front-line unit to the first user device, electronic notification data comprising the reward data and a description of the reward. An "electronic notification data" as used herein refers to any sort of notification received by the first user device to notify or alert the user that they have received a reward. Electronic notification data may comprise auditory, graphical messaging, text/SMS messages, haptic feedback, or the like, or electronic notification data may be a combination thereof. Electronic notification data typically comprises the reward data and the description of the reward.

Continuing in block 212, electronic notification data may be displayed on a graphical user interface of the first user device, such that when the user interacts with the first user device, the user is presented with a graphical, text, video, or other transformative embodiment of electronic notification data capable of notifying the user that they have received the reward. The reward data and the first user device may be configured such that the reward data is capable of being stored within the first user device, typically in a memory device of the first user device such as a repository. In this way, the user is able to save the reward data for use at a later date.

FIG. 3 illustrates a block diagram 300 of generating outputs from a system and method for sharing shareable electronic notification data via a hardware device network, in accordance with some embodiments of the present invention. The process begins in block 302 by determining one or more secondary users by accessing contacts information stored in the memory device of the first user device of the user, wherein the secondary users are associated with the entity and in proximity to the user. One of the features of some embodiments of the invention is the capability to share the reward data received by the first user device to a second user device (or a plurality of user devices). In this way, a group of friends, colleagues, etc. may be motivations to participate in group activities together, and if one user receives a reward, that user may share the reward data with other users to which they are acquainted. To prevent unselective sharing of reward data to others with whom a first user is not acquainted, these one or more secondary users may be determined based on the contents of a memory device of the first user device, such as a contacts lists, social media connections, recent phone or SMS message interactions, or the like.

The front-line unit, having established communicable links between the front-line unit and users nearby, is configured to determine based on comparing the list of users with which it has established a communicable link and those of which are in the memory device of one or more user devices (or in this embodiment, a first user device). By comparing names, phone numbers, unique identifiers such as MAC addresses or the like, the system compares and flags users in the front-line unit and/or the first user device based on these commonalities. Once these secondary users are flagged, the system has positively identified that i) the secondary user is in proximity to the front-line unit, and therefore in proximity to the user, and ii) the secondary user and the user are acquaintances.

Block 304 continues the process by establishing a second communicable link, the second communicable link is between the first user device and the second user device. The second communicable link is much like the first communicable link between the first user device and the front-line unit, however the second communicable link is between two user devices: the first user device and a second user device, the second user device belonging to one of the secondary users. The communicable link is established using a wireless signal, although this wireless signal may be different or the same as the wireless signal for the first communicable link.

For one non-limiting example, the first communicable link may be via Bluetooth, however the second communicable link may be via cellular network(s). In any combination, the second communicable link allows a connection between the first user device and the second user device, such that the communicable link allows the transmission of data to and/or from the first user device and the second user device. Typically, this data comprises the reward data, electronic notification data, or the like. In some embodiments, the system may be configured to allow for additional commentary such as words, phrases, GIFs, or the like from the user on the first user device to accompany the data when sent to the second user device via the communicable link.

Block 306 continues by displaying on the first user device, on a graphical user interface of the first user device, the option to share the reward data with the second user device (s), and thereby share the reward data with the secondary user(s) associated with such second user device(s). The option to share the reward data may be presented along with electronic notification data on the first user device, or may be a supplementary dialogue box such as graphics, hyperlink, or text which encourages the first user to share the reward data with the secondary users. When the user interacts with the option to share the reward data, the system is configured to transmit the reward data via the wireless signal to from the first user device to the second user device.

In some embodiments, the secondary user(s) may be prompted with electronic notification data and/or option to receive the reward data on the second user device. Electronic notification data and/or option to receive may comprise auditory, graphical messaging, text/SMS messages, haptic feedback, or the like, or electronic notification data may be a combination thereof. Electronic notification data typically comprises the reward data and the description of the reward. The reward data and the second user device may be configured such that the reward data is capable of being stored within the second user device, typically in a memory device of the second user device such as a repository. In this way, the user is able to save the reward data for use at a later date.

Although the previous embodiment of the invention comprises the sharing of reward data occurring directly between the first user device and the second user device via a wireless signal, additional embodiments are described henceforth which contemplate the system sharing the reward data directly from the front-line unit (instead of from the first user device), such that the first user device is only utilized to identify secondary users which the user is acquainted, and the sharing of the reward data is accomplished by the front-line unit when either i) the first user has initiated the option to share on the first user device, or ii) the secondary user, on the second user device has confirmed electronic notification data and/or option to receive the reward data.

FIG. 4 illustrates a block diagram 400 of a system and method for sharing and transmitting shareable electronic notification data via a hardware device network, in accordance with some embodiments of the invention. The process begins in block 402, a third communicable link is established, wherein the third communicable link is between the front-line unit and the second user device, and wherein the third communicable link between the front-line unit and the second user device is configured to transmit the reward data to the second user device from the front-line unit. As previously discussed, this in an additional embodiment which is in lieu if the second communicable link between the first user device and the second user device. At this point in the process seen in FIG. 4, the front-line unit and the systems thereon have already identified i) the secondary users in proximity with the users, the secondary users being the secondary users identified to be acquainted with the user.

The third communicable link is much like the first communicable link between the first user device and the front-line unit, however the third communicable link is between two user devices: the second user device and the front-line unit, the second user device belonging to one of the secondary users. The third communicable link is established using a wireless signal, typically the same as the wireless signal for the first communicable link. The third communicable link allows a connection between the second user device and the front-line unit, such that the communicable link allows the transmission of data to and/or from the second user device and the front-line unit. Typically, this data comprises the reward data, electronic notification data, or the like.

Block 404 continues by displaying on the second user device, on a graphical user interface of the second user device, the reward data. The reward data may be presented along with electronic notification data on the second user device, or may be a supplementary dialogue box such as graphics, hyperlink, or text which was provided by the user when sharing the reward data with the secondary users. In some embodiments, the secondary user(s) may be prompted with electronic notification data and/or option to receive the reward data on the second user device. Electronic notification data and/or option to receive may comprise auditory, graphical messaging, text/SMS messages, haptic feedback, or the like, or electronic notification data may be a combination thereof. Electronic notification data typically comprises the reward data and the description of the reward data.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to data flowchart illustrations and/or block diagrams of systems, methods, and/or computer program products. It will be understood that each block included in the data flowchart illustrations and/or block diagrams, and combinations of blocks included in the data flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the data flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the data flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the data flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating and transmitting shareable electronic notification data, the system comprising:

a memory device with computer-readable program code stored thereon;

a communication device;

a processing device operatively coupled to the memory device and the communication device, wherein the processing device is configured to execute the computer-readable program code to:

broadcast a wireless non-transitory signal from a point-of-sale device, the point-of-sale device connected to a network of a plurality of point-of-sale devices, the wireless non-transitory signal broadcasted unselectively;

determine a first user device in proximity of the point-of-sale device, using the point-of-sale device, based on both (i) an inferred distance of the first user device from the point-of-sale device using a signal strength of a received signal strength indicator from a first user device, and (ii) the first user device being in proximity of the point-of-sale device for a specified time period;

establish a first communicable link between the point-of-sale device and the first user device, the first communicable link established by connecting the point-of-sale device and the first user device via the wireless non-transitory signal;

send, to the point-of-sale device, a rewards database from one or more merchants, the rewards database comprising reward data associated with each merchant, wherein the rewards database is thereafter maintained by the point-of-sale device;

transmit electronic notification data from the point-of-sale device to the first user device while preventing redundant transmissions when multiple point-of-sale devices are within proximity of the first user device, the electronic notification data comprising the reward data and a description of the reward, wherein each point-of-sale device in the network of the plurality of point-of-sale devices individually determines proximity information of the first user device and communicates across the network to other point-of-sale devices to resolve conflicts, wherein redundant transmissions are prevented by, in instances in which the first user device is within two or more geographic radius boundaries of point-of-sale devices, the system automatically registering the first user device to the point-of-sale device nearest to the first user device and establishing the first communicable link between the first user device and the point-of-sale device nearest to the first user device;

display the electronic notification data on a graphical user interface of the first user device;

determine a second user device associated with the first user device based on contacts information stored in a memory device of the first user device;

establish a second communicable link, the second communicable link being between the first user device and the second user device;

display on the first user device an option to share the reward data from the first user device to the second user device;

establish a third communicable link, the third communicable link between the point-of-sale device and the second user device;

transmit, via the second communicable link, the reward data from the first user device to the second user device;

display the electronic notification data comprising reward data on the graphical user interface of the second user device;

receive, at the point-of-sale device via the third communicable link, the reward data from the second user device; and update the rewards database at the point-of-sale device to delete corresponding rewards data in the rewards database upon occurrence of a predetermined condition.

2. The system of claim 1, wherein the processing device is further configured to execute the computer-readable program code to store the reward data on a local repository of the first user device for use at a later time.

3. The system of claim 1, wherein determining the first user device in proximity of the point-of-sale device comprises measuring the received signal strength indicator and inferring a distance of the first user device from the point-of-sale device based on the received signal strength indicator.

4. The system of claim 3, wherein the first user device is determined to be in proximity of the point-of-sale device when the received signal strength indicator measurement satisfies a predefined proximity threshold.

5. The system of claim 1, wherein establishing the first communicable link between the point-of-sale device and the first user device comprises transmitting a request to the first user device requiring user acceptance prior to establishing the first communicable link.

6. A computer program product for generating and transmitting shareable electronic notification data, the computer program product comprising at least one non-transitory computer-readable medium having computer-readable program code portions embodied therein, the computer-readable program code portions causing an apparatus to:

broadcast a wireless non-transitory signal from a point-of-sale device, the point-of-sale device connected to a network of a plurality of point-of-sale devices, the wireless non-transitory signal broadcasted unselectively;

determine a first user device in proximity of the point-of-sale device, using the point-of-sale device, based on both (i) an inferred distance of the first user device from the point-of-sale device using a signal strength of a received signal strength indicator from a first user device, and (ii) the first user device being in proximity of the point-of-sale device for a specified time period;

establish a first communicable link between the point-of-sale device and the first user device, the first communicable link established by connecting the point-of-sale device and the first user device via the wireless non-transitory signal;

send, to the point-of-sale device, a rewards database from one or more merchants, the rewards database comprising reward data associated with each merchant, wherein the rewards database is thereafter maintained by the point-of-sale device;

transmit electronic notification data from the point-of-sale device to the first user device while preventing redundant transmissions when multiple point-of-sale devices are within proximity of the first user device, the electronic notification data comprising the reward data and a description of the reward, wherein each point-of-sale device in the network of the plurality of point-of-sale devices individually determines proximity information of the first user device and communicates across the network to other point-of-sale devices to resolve conflicts, wherein redundant transmissions are prevented by, in instances in which the first user device is within two or more geographic radius boundaries of point-of-sale devices, the system automatically registering the first user device to the point-of-sale device nearest to the first user device and establishing the first communicable link between the first user device and the point-of-sale device nearest to the first user device;

display the electronic notification data on a graphical user interface of the first user device;

determine a second user device associated with the first user device based on contacts information stored in a memory device of the first user device;

establish a second communicable link, the second communicable link being between the first user device and the second user device;

display on the first user device an option to share the reward data from the first user device to the second user device;

establish a third communicable link, the third communicable link between the point-of-sale device and the second user device;

transmit, via the second communicable link, the reward data from the first user device to the second user device;

display the electronic notification data comprising reward data on the graphical user interface of the second user device;

receive, at the point-of-sale device via the third communicable link, the reward data from the second user device; and update the rewards database at the point-of-sale device to delete corresponding rewards data in the rewards database upon occurrence of a predetermined condition.

7. The computer program product of claim 6, wherein the computer-readable program code portions further cause the apparatus to store the reward data on a local repository of the first user device for use at a later time.

8. The computer program product of claim 6, wherein determining the first user device in proximity of the point-of-sale device comprises measuring the received signal strength indicator and inferring a distance of the first user device from the point-of-sale device based on the received signal strength indicator.

9. The computer program product of claim 8, wherein the first user device is determined to be in proximity of the point-of-sale device when the received signal strength indicator measurement satisfies a predefined proximity threshold.

10. The computer program product of claim 6, wherein establishing the first communicable link between the point-of-sale device and the first user device comprises transmitting a request to the first user device requiring user acceptance prior to establishing the first communicable link.

11. A computer-implemented method for generating and transmitting shareable electronic notification data, the method comprising:

providing a computing system comprising a computer processing device and a non-transitory computer readable medium, where the non-transitory computer readable medium comprises configured computer program instruction code, such that when said computer program instruction code is operated by said computer processing device, said computer processing device performs the following operations:

broadcasting a wireless non-transitory signal from a point-of-sale device, the point-of-sale device connected to a network of a plurality of point-of-sale devices, the wireless non-transitory signal broadcasted unselectively;

determining a first user device in proximity of the point-of-sale device, using the point-of-sale device, based on both (i) an inferred distance of the first user device from the point-of-sale device using a signal strength of a received signal strength indicator from a first user device, and (ii) the first user device being in proximity of the point-of-sale device for a specified time period;

establishing a first communicable link between the point-of-sale device and the first user device, the first communicable link established by connecting the point-of-sale device and the first user device via the wireless non-transitory signal;

sending, to the point-of-sale device, a rewards database from one or more merchants, the rewards database comprising reward data associated with each merchant, wherein the rewards database is thereafter maintained by the point-of-sale device;

transmitting electronic notification data from the point-of-sale device to the first user device while preventing redundant transmissions when multiple point-of-sale devices are within proximity of the first user device, the electronic notification data comprising the reward data and a description of the reward, wherein each point-of-sale device in the network of the plurality of point-of-sale devices individually determines proximity information of the first user device and communicates across the network to other point-of-sale devices to resolve conflicts, wherein redundant transmissions are prevented by, in instances in which the first user device is within two or more geographic radius boundaries of point-of-sale devices, the system automatically registering the first user device to the point-of-sale device nearest to the first user device and establishing the first communicable link between the first user device and the point-of-sale device nearest to the first user device;

displaying the electronic notification data on a graphical user interface of the first user device;

determining a second user device associated with the first user device based on contacts information stored in a memory device of the first user device;

establishing a second communicable link, the second communicable link being between the first user device and the second user device;

displaying on the first user device an option to share the reward data from the first user device to the second user device;

establishing a third communicable link, the third communicable link between the point-of-sale device and the second user device;

transmitting, via the second communicable link, the reward data from the first user device to the second user device;

displaying the electronic notification data comprising reward data on the graphical user interface of the second user device;

receiving, at the point-of-sale device via the third communicable link, the reward data from the second user device; and updating the rewards database at the point-of-sale device to delete corresponding rewards data in the rewards database upon occurrence of a predetermined condition.

12. The computer-implemented method of claim 11, wherein the computer processing device further performs storing the reward data on a local repository of the first user device for use at a later time.

13. The computer-implemented method of claim 11, wherein determining the first user device in proximity of the point-of-sale device comprises measuring the received signal strength indicator and inferring a distance of the first user device from the point-of-sale device based on the received signal strength indicator.

14. The computer-implemented method of claim 13, wherein the first user device is determined to be in proximity of the point-of-sale device when the received signal strength indicator measurement satisfies a predefined proximity threshold.

15. The computer-implemented method of claim 11, wherein establishing the first communicable link between the point-of-sale device and the first user device comprises transmitting a request to the first user device requiring user acceptance prior to establishing the first communicable link.

* * * * *